United States Patent [19]

Vaynshteyn

[11] Patent Number: 5,337,105
[45] Date of Patent: Aug. 9, 1994

[54] COMPACT CAMERA WITH AUTOMATICALLY EXTENDING FLIP-UP FLASH UNIT

[75] Inventor: Mikhail Vaynshteyn, Rochester, N.Y.

[73] Assignee: Eastman Kodak Company, Rochester, N.Y.

[21] Appl. No.: 3,032

[22] Filed: Jan. 13, 1993

[51] Int. Cl.⁵ ............................................. G03B 15/03
[52] U.S. Cl. ............................................. 354/149.11
[58] Field of Search ................ 354/126, 149.1, 149.11, 354/187, 288

[56] References Cited

U.S. PATENT DOCUMENTS

| | | | |
|---|---|---|---|
| 4,045,808 | 8/1977 | King | 354/126 |
| 4,710,005 | 12/1987 | Bennett | 354/126 |
| 4,752,794 | 6/1988 | Bohannon | 354/126 |
| 4,983,999 | 1/1991 | Meisezahl et al. | 354/149.11 |

Primary Examiner—Howard B. Blankenship
Attorney, Agent, or Firm—Roger A. Fields

[57] ABSTRACT

In a compact camera having a flash unit that is flipped up from the camera box for use and is flipped down towards the camera box for storage, the flash head is automatically extended from the taking lens to substantially avoid "red-eye" when the flash unit is flipped up and is automatically retracted to decrease the size of the flash unit when the flash unit is flipped down.

5 Claims, 1 Drawing Sheet

COMPACT CAMERA WITH AUTOMATICALLY EXTENDING FLIP-UP FLASH UNIT

BACKGROUND OF THE INVENTION

1. Field of the Invention

The invention relates generally to the field of photography, and in particular to a compact camera with a pivotally folding flash unit. More specifically, the invention relates to a compact camera having a flash unit that is flipped up from the camera body for use and is flipped down towards the camera body for storage.

2. Description of the Prior Art

A current trend in most camera design is to incorporate an electronic flash unit in the camera housing and yet make the housing relatively small in order to improve its ease of storage, portability and handling. As a consequence of making the camera housing small, however, the separation between the built-in flash unit and the taking lens is reduced, which possibly creates an undesirable effect commonly known as "red-eye". When using a flash unit and color print film, red-eye is typified by the pupils in the eyes of a person being photographed coming out red-tinted on a resulting color print. This phenomenon is attributable to the incidence into the taking lens of the red light reflected from the retinas in the person's eyes illuminated by the flash light.

Red-eye may be substantially avoided by increasing the separation between the flash unit and the taking lens. As a result, the light emitted from the flash unit will reach the eyes of a person being photographed at too great an angle to be reflected by his or her retinas into the taking lens. In this connection, commonly assigned U.S. Pat. No. 4,983,999, issued Jan. 8, 1991, discloses a compact camera having a flash unit that is flipped up from the camera body to distance the flash unit from the taking lens for flash photography and is flipped down against the camera body for storage. The flash unit comprises a neck or supporting part that is pivotally connected to the camera body and an integral flash-emitting head part. When the neck and head parts are flipped up, they are elevated above the top of the camera body. When the neck and head parts are flipped down, they become integrated with the front of the camera body.

Problem to be Solved by the Invention

In prior art U.S. Pat. No. 4,983,999, when the flash unit is flipped up, the distance between the flash-emitting head part of the flash unit and the taking lens is limited by the particular length of the neck part of the flash unit. Also, the combined length of the neck and head parts cannot be greater than the height of the camera body in order to integrate the flash unit with the camera body when the flash unit is flipped down. If the camera body is relatively small, then, when the flash unit is flipped up, the distance between the head part and the taking lens may not be sufficient to substantially avoid red-eye.

SUMMARY OF THE INVENTION

According to the invention, a compact camera comprising a camera body, a taking lens, and a pivotally supported electronic flash unit adapted to be flipped up from the camera body to distance the flash unit from the taking lens for flash photography and to be flipped down towards the camera body for storage, is characterized by:

means, responsive to the flash unit being flipped up from the camera body, for automatically extending the flash unit from the camera body to distance the flash unit from the taking lens farther than it is distanced from the taking lens when the flash unit is flipped up from the camera body, and, responsive to the flash unit being flipped down towards the camera body, for automatically retracting the flash unit towards the camera body the same amount it was automatically extended.

DETAILED DESCRIPTION OF THE PREFERRED EMBODIMENT

The invention is disclosed as being embodied in a compact 35 mm camera having an electronic flash unit. Because such photographic cameras have become generally known as typified by prior art U.S. Pat. No. 4,983,999, this description is directed in particular to camera elements forming part of or cooperating directly with the preferred embodiment. It is to be understood, however, that camera elements not specifically shown or described can take various forms known to persons of ordinary skill in the art.

Figure 1:
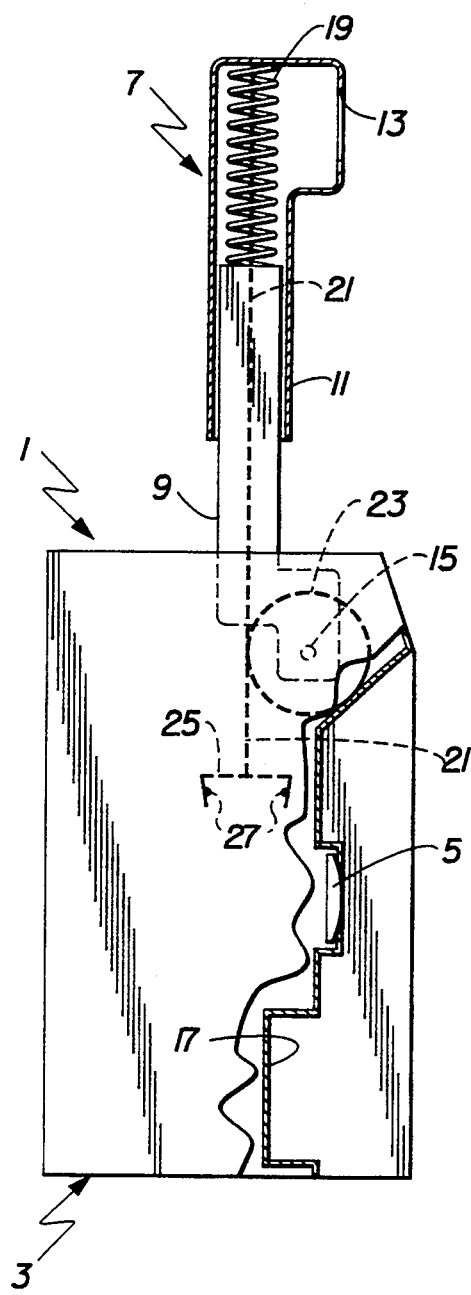
FIG. 1 is a side elevation view, partly in section, of a compact camera with an automatically extending flip-up flash unit according to a preferred embodiment of the invention, showing the flash unit flipped up from the camera body for use.
Figure 2:
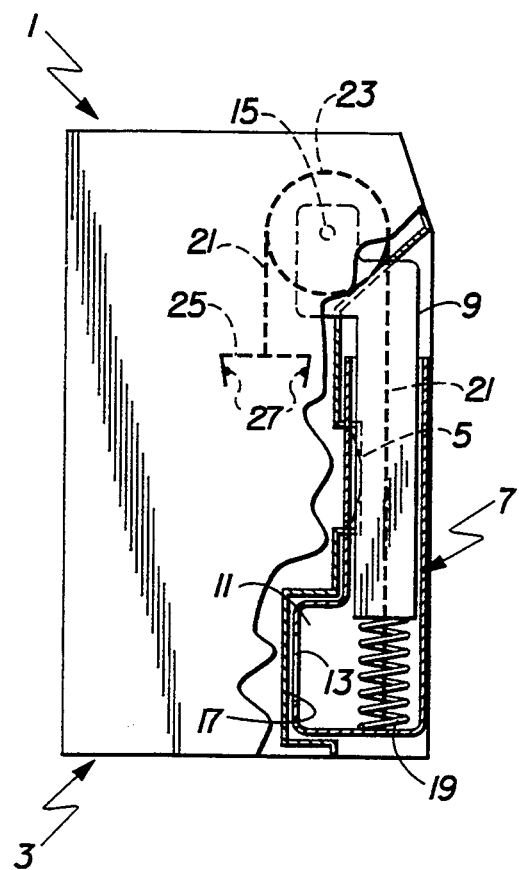
FIG. 2 is a side elevation view, partly in section, similar to FIG. 1, showing the flash unit flipped down for storage.

Referring now to the drawings, FIGS. 1 and 2 show a compact 35 mm camera 1 comprising a camera body 3, a known taking(objective) lens 5, and an electronic flash unit 7 having known flash-producing components (not shown).

The flash unit 7 includes a neck or supporting part 9 and a flash-emitting head part 11 having a flash emission window 13. The neck part 9 is pivotally connected to the camera body 3 via a pivot pin 15 for swinging movement relative to the camera body to flip the flash unit 7 up from the camera body to distance the flash emission window 13 from the taking lens 5 for flash picture-taking as depicted in FIG. 1 and to flip the flash unit down into a front recess 17 in the camera body for storage as depicted in FIG. 2. Although not shown, the neck part 9 has a cavity or opening into which the taking lens 5 protrudes when the flash unit 7 is flipped down into the recess 17. The head part 11 fits over the neck part 9 to allow the head part to be telescopingly extended and retracted with respect to the neck part. Consequently, when the flash unit 7 is flipped up as shown in FIG. 1, the head part 11 can be telescopingly extended from the neck part 9 to distance the flash-emission window 13 from the taking lens 5 farther than it is distanced from the taking lens when the flash unit is simply flipped up from the camera body and, when the flash unit is flipped down as shown in FIG. 2, the head part can be telescopingly retracted towards the neck part to fit the flash unit into the front recess 17 in the camera body.

A helical compression spring 19 is located between the head part 11 and the neck part 9 as shown in FIG. 1 to urge the head part to extend from the neck part. A flexible wire or ribbon 21 has one end anchored to the head part 11 and an opposite end anchored to the camera body 3 for winding half-way over a fixed pulley 23 to retract the head part towards the neck part 9 when the neck part is swung to flip the flash unit 7 down as depicted in FIG. 2 and for unwinding from over the pulley to allow the spring 19 to urge the head part to extend from the neck part when the neck part is swung to flip the flash unit up as depicted in FIG. 1. The wire 21 is electrically conductive and is connected to a battery holder 25, fixed to the camera body 3, in order to provide electrical power to the flash unit 7 for flash picture-taking. As shown in FIG. 1, the battery holder 25 has a pair of opposed contacts 27 intended to touch the respective battery terminals.

The invention has been described with reference to a preferred embodiment. However, it will be appreciated that variations and modifications can be effected within the ordinary skill in the art without departing from the scope of the invention.

I claim:

1. A compact camera comprising a camera body, a taking lens, and a pivotally supported electronic flash unit adapted to be flipped up from said camera body to distance said flash unit from said taking lens for flash photography and to be flipped down towards the camera body for storage, is characterized by:

means, responsive to said flash unit being flipped up from said camera body, for automatically extending the flash unit from the camera body to distance the flash unit from said taking lens farther than it is distanced from the taking lens when the flash unit is flipped up from the camera body, and, responsive to the flash unit being flipped down towards the camera body, for automatically retracting the flash unit towards the camera body the same amount it was automatically extended.

2. A compact camera as recited in claim 1, wherein said flash unit includes a neck part pivotally connected to said camera body for swinging movement relative to the camera body to flip the flash unit up and down and a flash-emitting head part slidably connected to said neck part for extending and retracting movement relative to the neck part to extend and retract the flash unit when the flash unit is flipped up and down.

3. A compact camera as recited in claim 2, wherein said automatically extending and retracting means includes a spring arranged to urge said head part to extend relative to said neck part and constraining means connected to said camera body and said head part for limiting the amount said spring can urge the head part to extend when said neck part is swung to flip said flash unit up and for retracting the head part said amount when said neck part is swung to flip said flash unit down.

4. A compact camera as recited in claim 3, wherein said constraining means includes a fixed pulley and a flexible wire anchored at one end to said camera body and at another end to said head part for winding at least partly over said pulley to retract the head part when said neck part is swung to flip said flash unit down and for unwinding from over the pulley to allow said spring to urge the head part to extend when the neck part is swung to flip the flash unit up.

5. A compact camera as recited in claim 4, wherein said flexible wire is electrically conductive and is connected to contacts for a battery power supply in order to provide electrical power to said head part for flash photography.

* * * * *